(12) United States Patent
Srivastava et al.

(10) Patent No.: US 9,787,746 B2
(45) Date of Patent: Oct. 10, 2017

(54) METHOD AND APPARATUS FOR PROCESSING MULTIMEDIA CONTENT ON A GRAPHIC CLOUD

(71) Applicant: Samsung Electronics Co., Ltd, Gyeonggi-do (KR)

(72) Inventors: Amar Srivastava, Noida UP (IN); Hemanshu Srivastava, Noida UP (IN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 198 days.

(21) Appl. No.: 14/171,531

(22) Filed: Feb. 3, 2014

(65) Prior Publication Data

US 2014/0222965 A1 Aug. 7, 2014

(30) Foreign Application Priority Data

Feb. 1, 2013 (IN) .............................. 443/CHE/2013
Jan. 17, 2014 (KR) ........................ 10-2014-0006025

(51) Int. Cl.
*H04L 29/06* (2006.01)
*G06F 9/50* (2006.01)
*G06T 1/20* (2006.01)

(52) U.S. Cl.
CPC ............ *H04L 65/607* (2013.01); *G06F 9/505* (2013.01); *G06T 1/20* (2013.01); *Y02B 60/142* (2013.01)

(58) Field of Classification Search
CPC ....... Y02B 60/142; H04L 65/607; G06T 1/20; G06F 9/505
USPC ...................................................... 709/219
See application file for complete search history.

(56) References Cited

U.S. PATENT DOCUMENTS

| 2006/0014057 | A1  | 1/2006 | Ellwood et al. |
| 2006/0146057 | A1  | 7/2006 | Blythe |
| 2012/0131178 | A1* | 5/2012 | Zhu ..................... H04L 67/1002 709/224 |
| 2012/0149464 | A1* | 6/2012 | Bone ..................... G06F 9/5044 463/30 |

(Continued)

OTHER PUBLICATIONS

Ravi, V., et al., "Supporting GPU Sharing in Cloud Environments with a Transparent Runtime Consolidation Framework," 20th AMC International Symposium on High-Performance Parallel and Distributed Computing, HPDC'11, San Jose, USA, Jun. 8-11, 2001, pp. 217-228.

(Continued)

*Primary Examiner* — Azizul Choudhury

(57) ABSTRACT

A method and system process multimedia content on a graphic cloud. The method includes determining a multimedia instance, determining a load balance associated with the multimedia instance, selecting a graphic card from a plurality of graphic cards for processing the multimedia instance, activating a plurality of ports associated with the graphic card for rendering the multimedia stream to a plurality of multimedia devices and transmitting the multimedia stream to the user. The system includes a multimedia device, a communication interface for establishing communication, a memory that stores instructions and a processor responsive to the instructions to determine a multimedia instance, determine a load balance, select a graphic card, activate a plurality of ports, and transmit the multimedia stream to the multimedia device.

10 Claims, 4 Drawing Sheets

(56) References Cited

U.S. PATENT DOCUMENTS

| | | |
|---|---|---|
| 2012/0254439 A1 | 10/2012 | Yamasaki et al. |
| 2013/0093776 A1* | 4/2013 | Chakraborty ............ G06F 9/505 345/520 |
| 2013/0210526 A1* | 8/2013 | Kim ..................... H04L 67/1002 463/42 |
| 2014/0092087 A1* | 4/2014 | Kazama .................. G06F 9/505 345/420 |

OTHER PUBLICATIONS

Foreign Communication From a Related Counterpart Application, European Application No. 14152901.6-1879, Extended European Search Report dated Jan. 30, 2017, 10 pages.

* cited by examiner

METHOD AND APPARATUS FOR PROCESSING MULTIMEDIA CONTENT ON A GRAPHIC CLOUD

CROSS-REFERENCE TO RELATED APPLICATION(S) AND CLAIM OF PRIORITY

The present application is related to and claims the priority under 35 U.S.C. §119(a) to Indian Patent Application No. 443/CHE/2013, which was filed in the Indian Patent Office on Feb. 1, 2013, and Korean Patent Application No. 10-2014-0006025, which was filed in the Korean Intellectual Office on Jan. 17, 2014, the contents of which are hereby incorporated by reference.

TECHNICAL FIELD

The present disclosure relates to the field of processing multimedia content on a graphic cloud.

BACKGROUND

Processing multimedia content on a graphic cloud is becoming increasingly essential as multiple multimedia devices can be rendered with the multimedia content simultaneously. Examples of the multimedia content include, but are not limited to, games, photo galleries, animations and video streams. Examples of the multimedia devices include, but are not limited to, an Internet Protocol Television (IPTV), a mobile phone, a tablet PC, a personal digital assistant (PDA) and a smart phone.

Conventionally, a graphic card is used for processing the multimedia content. A user of a multimedia device can purchase the graphic card for processing the multimedia content. Various graphic cards are available such that the user can purchase the graphic card based on one or more factors for processing the multimedia content. In one example, a game manufacturer will recommend a graphic card using which the game can run on the multimedia device. The graphic card is designed based on the factors such as capacity required for running the game. Hence, the user purchases the graphic card for running the game. Upon purchasing the graphic card, the user can access the graphic cloud for storing and processing the multimedia content. The graphic cloud includes various hardware and software units for processing the multimedia content. However, such hardware and software units are graphic card specific. Hence, it is mandatory for the user using a particular graphic card to utilize corresponding hardware and software units for processing the multimedia content. Also, if the user wishes to change the multimedia content, then the user is required to purchase another graphic card for processing the multimedia content. Further, some multimedia devices include an inbuilt graphic card for processing the multimedia content and hence do not enable the user to alter the graphic card dynamically based on requirement.

In the light of the foregoing discussion there is a need for an efficient method and a system for creating a hybrid graphic cloud that supports a plurality of graphic cards for processing the multimedia content.

SUMMARY

To address the above-discussed deficiencies, embodiments of the present disclosure described herein provide a method and system for processing multimedia content on a graphic cloud.

An example for a method processing multimedia content on a graphic cloud, the method comprising: transmitting a graphic call for initiating a multimedia instance to a graphic virtualization server; and receiving a multimedia stream associated the multimedia instance from the graphic virtualization server; the graphic virtualization server determining a load balance associated with the multimedia instance; selecting a graphic card for processing the multimedia instance the multimedia stream, selected multimedia stream activating a plurality of ports associated with the graphic card for rendering at least one of multimedia device.

An example for an apparatus for a radio unit configured to transmit a graphic call for initiating a multimedia instance to a graphic virtualization server; and to receiver a multimedia stream associated the multimedia instance from the graphic virtualization server; the graphic virtualization server determining a load balance associated with the multimedia instance; selecting a graphic card for processing the multimedia instance the multimedia stream, selected multimedia stream activating a plurality of ports associated with the graphic card for rendering at least one of multimedia device.

An example of a method of processing multimedia content on a graphic cloud includes determining a multimedia instance. The multimedia instance is being initiated by a user for receiving a multimedia stream. The method also includes determining a load balance associated with the multimedia instance. Further, the method includes selecting a graphic card from a plurality of graphic cards for processing the multimedia instance. Selection is being performed based on a plurality of factors. Furthermore, the method includes activating a plurality of ports associated with the graphic card for rendering the multimedia stream to a plurality of multimedia devices. Moreover, the method includes transmitting the multimedia stream to the multimedia devices.

An example of a system for processing multimedia content on a graphic cloud includes a multimedia device. The system also includes a communication interface for establishing communication. The system further includes a memory that stores instructions. The system further includes a processor responsive to the instructions to determine a multimedia instance; to select a graphic card from a plurality of graphic cards for processing the multimedia instance; to activate a plurality of ports associated with the graphic card for rendering the multimedia stream to a plurality of multimedia devices; and to transmit the multimedia stream to the multimedia devices.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

Throughout the drawings, like reference numerals will be understood to refer to like parts, components, and structures.

DETAILED DESCRIPTION

Figure 1:
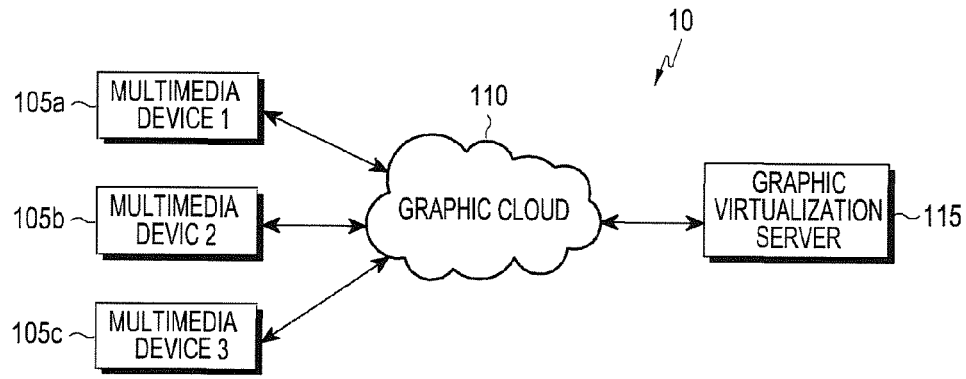
FIG. 1 illustrates a block diagram of a system in which various embodiments of the present disclosure can be implemented.

FIGS. 1 through 5, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

It should be observed the method steps and system components have been represented by conventional symbols in the figure, showing only specific details which are relevant for an understanding of the present disclosure. Further, details may be readily apparent to person ordinarily skilled in the art may not have been disclosed. In the present disclosure, relational terms such as first and second, and the like, may be used to distinguish one entity from another entity, without necessarily implying any actual relationship or order between such entities.

Embodiments of the present disclosure described herein provide a method and system for processing multimedia content on a graphic cloud.

The system 10 includes various multimedia devices, for example, a multimedia device 1 105a, a multimedia device 2 105b and a multimedia device 3 105c. The system 10 also includes a graphic virtualization server 115 that is connected to the multimedia devices through a graphic cloud 110. Examples of the multimedia devices include, but are not limited to, computers, laptops, mobile phones, handheld devices personal digital assistants (PDA) and telecommunication devices. The graphic cloud can be accessed through, for example a local area network (LAN), a wide area network (WAN) and wireless networks.

The multimedia devices are operable to receive and display multimedia stream to a user. Examples of the multimedia stream include, but are not limited to, games, photo galleries, animations and video streams.

In one example, the user of the multimedia device 1 105a initiates a multimedia instance, for example, a game instance. The multimedia instance is initiated by using a graphic call. Further, the graphic call, used for initiation of the game instance, is forwarded to the graphic virtualization server 115. Operating system (OS) included in the multimedia device 1 105a is configured to forward the graphic call to the graphic virtualization server 115.

Also, the graphic virtualization server 115 detects the graphic call and further determines a load balance associated with the game instance. The load balance determines processing power and virtual memory required for processing the game instance.

Upon determining the load balance associated with the game instance, a graphic card is selected from a plurality of graphic cards stacked on the graphic virtualization server 115. The graphic card is selected to enable processing of the game instance such that the game instance is rendered to the user of the multimedia device 1 105a. The plurality of graphic cards is provided by a plurality of graphic card vendors. The graphic card is selected based on a plurality of factors.

Further, upon selecting the graphic card, the graphic virtualization server 115 activates a plurality of ports associated with the graphic card. Further, one or more parameters are set by the graphic virtualization server 115 to define display settings of a multimedia stream associated with the game instance. The multimedia stream associated with the game instance can be rendered to the multimedia devices based on number of ports that are activated.

Furthermore, upon activation of the ports associated with the graphic card, the multimedia stream associated with the game instance is transmitted to the user of the multimedia device 1 105a.

Hence, the graphic cloud that includes the graphic cards, of the graphic card vendors, for processing multimedia streams can be created. By performing selection, a graphic card that is appropriate is used for processing the multimedia streams.

Figure 2:
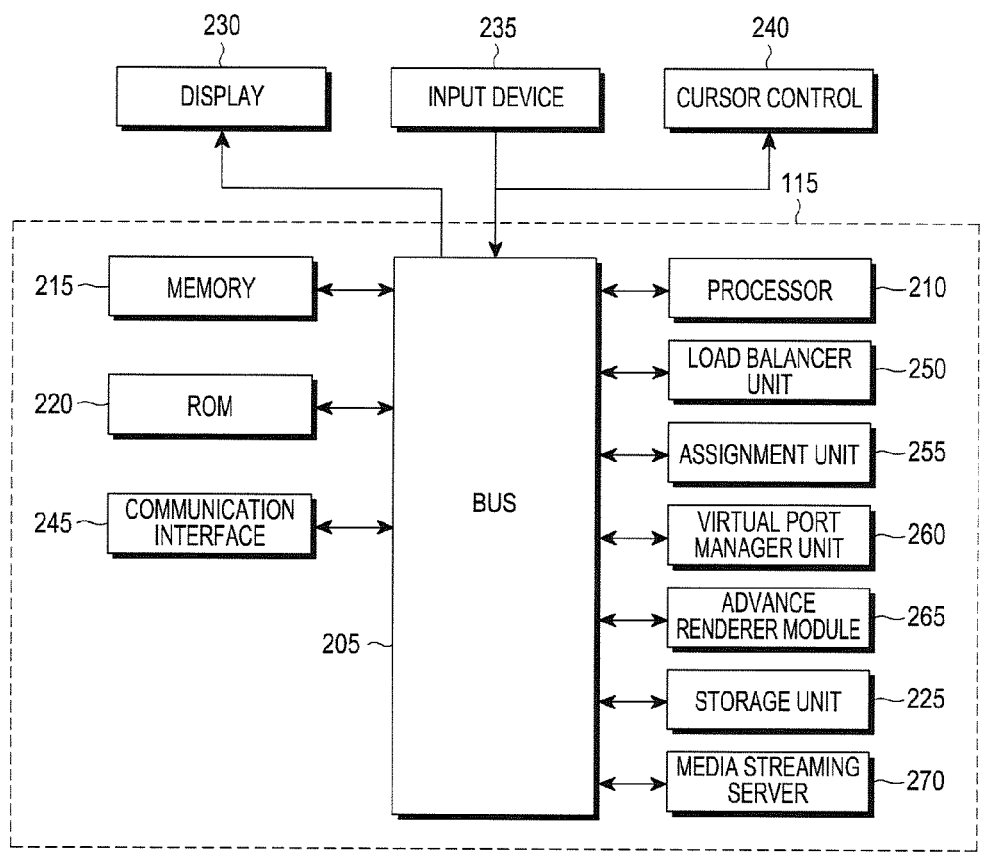
FIG. 2 illustrates a block diagram of a graphic virtualization server for processing multimedia content on a graphic cloud in accordance with various embodiments of the present disclosure.

FIG. 2 illustrates a block diagram of the graphic virtualization server 115 for processing multimedia content on a graphic cloud in accordance with various embodiments of the present disclosure.

The graphic virtualization server 115 includes a bus 205 or other communication mechanism for communicating information, and a processor 210 coupled with the bus 205 for processing information. The graphic virtualization server 115 also includes a memory 215, for example a random access memory (RAM) or other dynamic storage device, coupled to the bus 205 for storing information and instructions to be executed by the processor 210. The memory 215 can be used for storing temporary variables or other intermediate information during execution of instructions by the processor 210. The graphic virtualization server 115 further includes a read only memory (ROM) 220 or other static storage device coupled to the bus 205 for storing static information and instructions for the processor 210. A storage unit 225, for example a magnetic disk or optical disk, is provided and coupled to the bus 205 for storing information, for example a plurality of frames associated with a multimedia stream.

The graphic virtualization server 115 can be coupled via the bus 205 to a display 230, for example a cathode ray tube (CRT), for displaying the multimedia stream. The input device 235, including alphanumeric and other keys, is coupled to the bus 205 for communicating information and command selections to the processor 210. Another type of user input device is the cursor control 240, for example a mouse, a trackball, or cursor direction keys for communicating direction information and command selections to the processor 210 and for controlling cursor movement on the display 230.

Various embodiments are related to the use of the graphic virtualization server 115 for implementing the techniques described herein. In some embodiments, the techniques are performed by the graphic virtualization server 115 in response to the processor 210 executing instructions included in the memory 215. Such instructions can be read into the memory 215 from another machine-readable medium, for example the storage unit 225. Execution of the instructions included in the memory 215 causes the processor 210 to perform the process steps described herein.

In some embodiments, the processor 210 can include one or more processing units for performing one or more functions of the processor 210. The processing units are hardware circuitry used in place of or in combination with software instructions to perform specified functions.

The term "machine-readable medium" as used herein refers to any medium that participates in providing data that causes a machine to perform a specific function. In an embodiment implemented using the graphic virtualization server 115, various machine-readable media are involved, for example, in providing instructions to the processor 210 for execution. The machine-readable medium can be a storage medium, either volatile or non-volatile. A volatile medium includes, for example, dynamic memory, such as the memory 215. A non-volatile medium includes, for example, optical or magnetic disks, for example the storage unit 225. All such media may need to be tangible to enable the instructions carried by the media to be detected by a physical mechanism that reads the instructions into a machine.

Common forms of machine-readable media include, for example, a floppy disk, a flexible disk, hard disk, magnetic tape, or any other magnetic media, a CD-ROM, any other optical media, punchcards, papertape, any other physical media with patterns of holes, a RAM, a PROM, and EPROM, a FLASH-EPROM, any other memory chip or cartridge.

In another embodiment, the machine-readable media can be transmission media including coaxial cables, copper wire and fiber optics, including the wires that include the bus 205. Transmission media can also take the form of acoustic or light waves, such as those generated during radio-wave and infra-red data communications. Examples of machine-readable media may include, but are not limited to, a carrier wave as described hereinafter or any other media from which the graphic virtualization server 115 can read. For example, the instructions can initially be carried on a magnetic disk of a remote computer. The remote computer can load the instructions into the remote computer's dynamic memory and send the instructions over a telephone line using a modem. A modem local to the graphic virtualization server 115 can receive the data on the telephone line and use an infra-red transmitter to convert the data to an infra-red signal. An infra-red detector can receive the data carried in the infra-red signal and appropriate circuitry can place the data on the bus 205. The bus 205 carries the data to the memory 215, from which the processor 210 retrieves and executes the instructions. The instructions received by the memory 215 can optionally be stored on the storage unit 225 either before or after execution by the processor 210. All such media may need to be tangible to enable the instructions carried by the media to be detected by a physical mechanism that reads the instructions into a machine.

The graphic virtualization server 115 also includes a communication interface 245 coupled to the bus 205. The communication interface 245 provides a two-way data communication coupling to the processor 210. For example, the communication interface 245 can be an integrated services digital network (ISDN) card or a modem to provide a data communication connection to a corresponding type of telephone line. As another example, the communication interface 245 can be a local area network (LAN) card to provide a data communication connection to a compatible LAN. In any such implementation, the communication interface 245 sends and receives electrical, electromagnetic or optical signals that carry digital data streams representing various types of information.

The processor 210 in the graphic virtualization server 115 is configured to determine a multimedia instance. The multimedia instance is being initiated by a user, using a graphic call, for receiving the multimedia stream. The processor 210 determines the multimedia instance upon receiving the graphic call.

The processor 210 is also operable to determine a load balance associated with the multimedia instance. A load balancer unit 250 included in the graphic virtualization server 115 is used for determining the load balance associated with the multimedia instance. The load balance, determined by the load balancer unit 250, is used to identify processing power and virtual memory required for processing the multimedia instance. The load balancer unit 250 further stores the load balance associated with a plurality of graphic cards.

The processor 210 is also operable to select a graphic card from a plurality of graphic cards for processing the multimedia instance. An assignment unit 255 is used to perform selection based on a plurality of factors. Examples of the factors include, but are not limited to, graphical processing unit (GPU) usage by the multimedia instance, minimum, maximum and average GPU usage of the graphic cards, frame per second (fps) requirement of the multimedia instance, run time dependency associated with the graphic cards, resolution and color depth of the multimedia instance, hardware and software requirements for processing the multimedia instance in runtime and cost of the graphic cards.

The selection is performed such that the graphic card selected enables offloading of tasks associated during the processing of the multimedia instance, preprocessing of the multimedia instance8, post processing of the multimedia instance and rendering of the multimedia instance.

The processor 210 included in the graphic virtualization server 115 is also configured to activate a plurality of ports associated with the graphic card for rendering the multimedia stream to a plurality of multimedia devices. A virtual port managing unit 260 upon receiving an activation command from the processor 210 activates the ports associated with the graphic card.

Further, the virtual port managing unit 260 is configured to activate one or more parameters that are used to define display settings associated with the multimedia stream. Examples of the parameters include, but are not limited to, resolution, color depth and the like.

Further the graphic virtualization server 115 includes an advance renderer module 265 that is operable to store the multimedia stream in a non-paged memory or a virtual memory. If the multimedia stream includes an increased buffer rate, then the multimedia stream can be processed and stored in the non-paged memory. Further, if multimedia stream includes a lowered buffer rate, then the multimedia stream can be processed and stored in the virtual memory.

Storing of the multimedia stream, by the advance renderer module 265, in a non-paged memory or a virtual memory is performed to enable efficient processing of the multimedia stream with reduced delay time.

Furthermore the graphic virtualization server 115 includes a media streaming server 270 that is operable to compress the multimedia stream prior to transmitting the multimedia stream to the user. One or more compressing techniques are used, by the media streaming server 270, for compressing the multimedia stream. Compression is used to obtain reduced bandwidth during the transmission of the multimedia stream.

The media streaming server 270 is also configured to transmit the multimedia stream to the user. Further, the media streaming server 270 is operable to decompress the multimedia stream prior to displaying the multimedia stream to the user.

Figure 3:
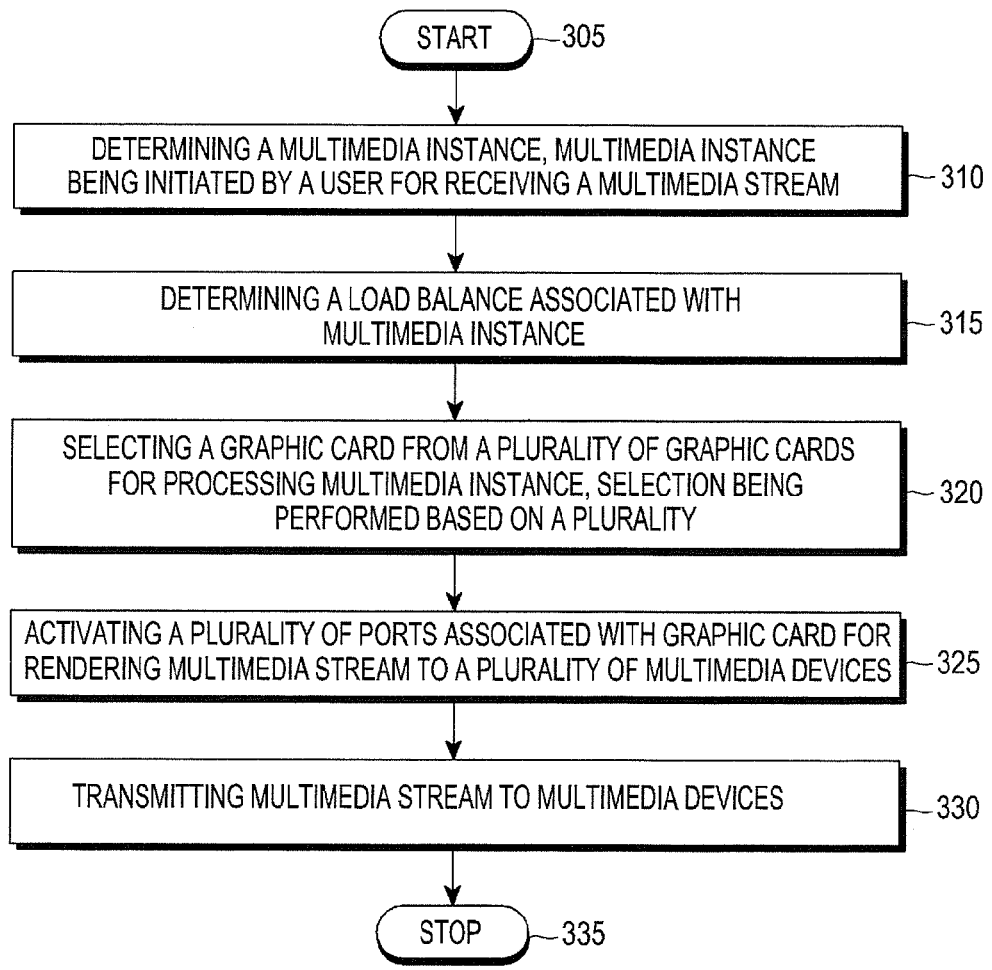
FIG. 3 illustrates a flowchart of a method of processing multimedia content on a graphic cloud in accordance with various embodiments of the present disclosure.

A method of processing multimedia content on a graphic cloud is explained in detail in conjunction with FIG. 3.

FIG. 3 illustrates a flowchart of a method of processing multimedia content on a graphic cloud in accordance with various embodiments of the present disclosure.

The method starts at step 305.

At step 310 a multimedia instance is determined. The multimedia instance may be initiated by a user for receiving a multimedia stream. The multimedia instance may be initiated using a graphic call. The multimedia instance is determined upon receiving the graphic call by a processor, for example, the processor 210.

At step 315 a load balance associated with the multimedia instance is determined. The load balance indicates processing power and virtual memory required for processing the multimedia instance. A load balancer unit, for example, the load balancer unit 250, is used for determining the load balance.

Further, each graphic card is associated with a load balance that indicates the processing power of the graphic card for processing multimedia instances. Also, the method includes storage of the load balance associated with each graphic card present in the graphic cloud. The load balancer unit is used for storing the load balance associated with each graphic card.

At step 320, a graphic card is selected, from a plurality of graphic cards, for processing the multimedia instance. The graphic cards, from a plurality of graphic card vendors, are present on a graphic cloud. The graphic cloud is referred to as a hybrid graphic cloud since the graphic cloud includes graphic cards from various graphic card vendors. Selection of the graphic card is performed based a plurality of factors. Examples of the factors include, but are not limited to, GPU usage by the multimedia instance, minimum, maximum and average, GPU usage of the graphic cards, fps requirement of the multimedia instance, run time dependency associated with the graphic cards, resolution and color depth of the multimedia instance, hardware and software requirements for processing the multimedia instance in runtime and cost of the graphic card.

Further, each multimedia instance is associated with a profile that includes information associated with the processing power and the virtual memory required for processing the multimedia instance. The profile enables selection of the graphic card that is appropriate for processing the multimedia instance.

The graphic card selected enables to offload tasks associated during the processing of the multimedia instance, preprocessing of the multimedia instance, post processing of the multimedia instance and rendering of the multimedia instance.

Also, the graphic card selected is such that the graphic card enables rendering of the multimedia stream on the multimedia devices that do not support alteration of graphic cards.

At step 325 a plurality of ports associated with the graphic card is activated for rendering the multimedia stream to a plurality of multimedia devices. An activation command provided by a processor, for example the processor 210 to a virtual port managing unit, for example the virtual port managing unit 260 is used to activate the ports.

Further one or more parameters are activated for defining display settings associated with the multimedia stream. Examples of the parameters include, but are not limited to, resolution, color depth and the like.

The method also includes storage of the multimedia stream in one of a non-paged memory and a virtual memory. The storage is performed based on a processing speed associated with the multimedia stream. Further the storage of the multimedia stream in the non-paged memory or the virtual memory is performed to enable efficient processing of the multimedia stream with reduced delay time.

In one example, if the fps associated with the multimedia stream is relatively low, then the multimedia stream can be stored in the virtual memory. Further, if the fps associated with the multimedia stream is relatively high, then the multimedia stream can be stored in the non-paged memory.

Further the method includes compression of the multimedia stream prior to transmission of the multimedia stream to the user. The compression is performed to ensure efficient bandwidth consumption during the transmission.

At step 330 the multimedia stream is transmitted to the multimedia device. Upon the transmission, the multimedia stream is decompressed and further displayed to the user of a multimedia device.

The method stops at step 335.

Advantageously, the embodiments specified in the present disclosure provide an efficient method to develop a hybrid graphic cloud that includes a plurality of graphic cards, from various graphic card vendors, for processing multimedia streams. Also, the graphic cloud that is hybrid enables selection of a graphic card in real time such that the graphic card, selected, processes the multimedia streams independent of the hardware and software applications thereby, preventing the user from explicitly purchasing graphic cards for processing. Further, the method enables selection of the graphic card that is appropriate for processing different multimedia streams.

In the preceding specification, the present disclosure and its advantages have been described with reference to specific embodiments. However, it will be apparent to a person of ordinary skill in the art that various modifications and changes can be made, without departing from the scope of the present disclosure, as set forth in the claims below. Accordingly, the specification and figures are to be regarded as illustrative examples of the present disclosure, rather than in restrictive sense. All such possible modifications are intended to be included within the scope of present disclosure.

Figure 4:
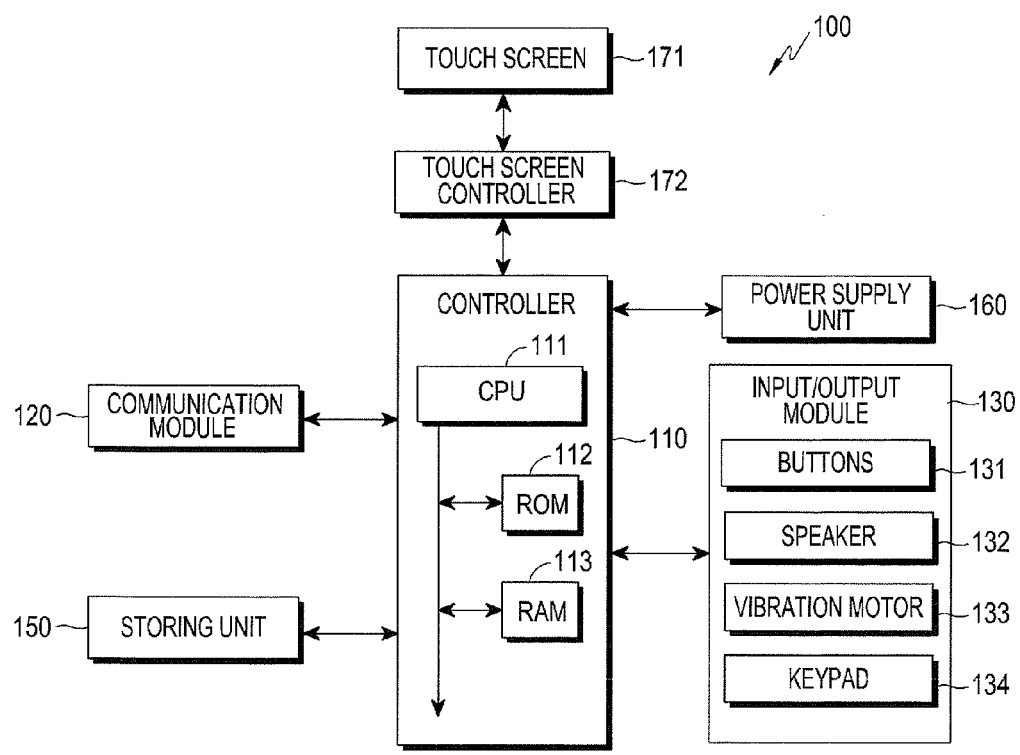
FIG. 4 is a block diagram showing a detailed structure of a multimedia device according to an exemplary embodiment of the present invention.

Referring to FIG. 4, a multimedia device 100 according to an embodiment of the present invention may include a controller 110, a communication module 120, an input/output module 130, a storing unit 150, a power supply unit 160, a touch screen 171, and a touch screen controller 172.

The controller 110 may include a Central Processing Unit (CPU) 111, a Read Only Memory (ROM) 112 in which a control program for controlling the multimedia device 100 is stored, and a Random Access Memory (RAM) 113 which memorizes a signal or data input from the outside of the multimedia device 100 or is used as a memory region for a task performed in the multimedia device 100. The CPU 111, the ROM 112, and the RAM 113 may be interconnected through an internal bus. The controller 110 may control the communication module 120, the input/output module 130, the storing unit 150, the power supply unit 160, the touch screen 171, and the touch screen controller 172. The controller 110 may include a single core processor or a multi-core processor such as a dual core, a triple core, or a quad core processor. The number of cores may be provided by those of ordinary skill in the art variously according to characteristics of the terminal.

The communication module 120 includes at least one of a cellular module, a Wireless Local Area Network (WLAN) module, and a short-range communication module. The cellular module enables the multimedia device 100 to be connected with an external device via at least one—one or a plurality of—antennas through mobile communication under control of the controller 110. The cellular module transmits/receives a wireless signal for a voice call, a video call, a text message (Short Messaging Service: SMS), and/or a multimedia message (Multi Media Service: MMS) with a cellular phone (not illustrated), a smart phone (not illustrated), a tablet PC, or another electronic device (not illustrated) which has a phone number input into the electronic device 100.

The WLAN module may be connected to the Internet in a place where a wireless AP (not illustrated) is installed, under control of the controller 110. The WLAN module supports the WLAN standard IEEE802.11x of the Institute of Electrical and Electronics Engineers (IEEE). The WLAN module may drive a Wi-Fi Positioning System (WPS) for checking position information of a terminal including the WLAN module by using position information provided by a wireless AP connected wirelessly.

The short-range communication module may wirelessly perform short-range communication with the multimedia device 100 under control of the controller 110, and may process communication based on short-range communication such as Bluetooth, infrared data association (IrDA), WiFi-Direct communication, NFC communication, or the like.

The communication module 120 may also perform data communication with another electronic device connected by a Universal Serial Bus (USB) communication cable or a serial communication cable based on predetermined communication (for example, USB communication or serial communication).

The input/output module 130 may include at least one of buttons 131, a speaker 132, and a vibration motor 133.

The buttons 131 may be formed on a front surface, a side surface, or a rear surface of a housing of the multimedia device 100, and may include at least one of a power/lock button (not shown), a volume button (not shown), a menu button, a home button, a back button, and a search button.

The speaker 132 outputs sound corresponding to various signals (for example, a wireless signal or a broadcast signal) of the cellular module, the WLAN module, and the short-range communication module to the outside of the multimedia device 100. One or more speakers 132 may be formed in a proper position or proper positions of a housing of the multimedia device 100.

The vibration motor 133 converts an electrical signal into mechanical vibration under control of the controller 110. A single vibration motor or multiple vibration motors may be formed in the housing of the multimedia device 100.

The speaker 132 and the vibration motor 133 may operate according to a setting state of a volume operation mode of the multimedia device 100. For example, the volume operation mode of the multimedia device 100 may include a ringer mode, a vibration mode, a ringer and vibration mode, and a silent mode and may be set to one of those modes. The controller 110 outputs a signal for instructing an operation of the speaker 132 or the vibration motor 133 according to a function to be performed by the multimedia device 100 based on the set volume operation mode.

The storing unit 150 stores input/output signals or data corresponding to operations of the input/output module 130 and the touch screen 171 under control of the controller 110. The storing unit 150 also stores control programs and applications for controlling the multimedia device 100 or the controller 110.

The term 'storing unit' may include the storing unit 150, the ROM 112 and the RAM 113 in the controller 110, or a memory card (not illustrated) mounted in the electronic device 100 (for example, a Secure Digital (SD) card, a memory stick). The storing unit 150 may include a non-volatile memory, a volatile memory, a Hard Disk Drive (HDD), or a Solid State Drive (SSD).

The power supply unit 160 supplies power to one or plural batteries (not illustrated) disposed in the housing of the multimedia device 100 under control of the controller 110. The one or plural batteries (not illustrated) supply power to the multimedia device 100. The power supply unit 160 may supply power input from an external power source (not illustrated) through a wired cable connected with a connector, which is included in the multimedia device 100, to the multimedia device 100.

The touch screen 171 displays a user interface corresponding to various services (for example, call, data transmission, broadcasting, picture/moving image capturing) to the user based on an Operating System (OS) of the terminal. The touch screen 171 transfers an analog signal corresponding to at least one touch input to the user interface to the touch screen controller 172. The touch screen 171 receives at least one touch through a user's body (for example, a finger including a thumb) or a touch-possible input means (for example, a stylus pen). The touch screen 171 receives continuous movement of one of the at least one touch. The touch screen 171 transfers an analog signal corresponding to continuous movement of the received touch to the touch screen controller 172.

The touch screen 171 may be of, for example, a resistive type, a capacitive type, an infrared type, or an acoustic wave type.

The touch screen controller 172 controls an output value of the touch screen 171 to allow display data provided from the controller 110 to be displayed on the touch screen 171. The touch screen controller 172 converts an analog signal received from the touch screen 171 into a digital signal (for example, X and Y coordinates) and transfers the digital signal to the controller 110.

The controller 110 described above processes a user input by using data provided from the touch screen 171 and the touch screen controller 172. That is, the controller 110 controls the touch screen 171 by using the digital signal received from the touch screen controller 172. For example, the controller 110 may control a shortcut icon (not illustrated) displayed on the touch screen 171 to be selected or a shortcut icon (not illustrated) to be executed in response to a touch event or a hovering event.

While it has been described in an embodiment of the present invention that the user input is received through the touch screen 171, the present invention is not limited thereto and the user input may be recognized and processed through various components. For example, the multimedia device 100 according to an embodiment of the present invention may include a sensor module or a camera module, and by using data input through the sensor module or the camera module, the user input may be processed.

For instance, the sensor module may include one or more sensors for detecting a state of the multimedia device 100. For example, the sensor module 170 may include at least one of a proximity sensor for detecting user's proximity to the multimedia device 100, an illumination sensor (not illustrated) for detecting an amount of light around the multimedia device 100, and an RGB sensor. The sensor module may also include a motion sensor (not illustrated) for detecting a motion of the multimedia device 100 (for example, rotation of the multimedia device 100 or acceleration or vibration applied to the multimedia device 100). Information detected by the sensor module may be provided to the controller 110 which may process the user input using the detected information.

Moreover, the camera module may include a camera provided in the front or rear surface of the multimedia device 100 to capture a still or moving image under control of the controller 110. The still or moving image captured by the camera may be provided to the controller 110. The controller 110 may process the user input by using the still or moving image provided from the camera.

Figure 5:
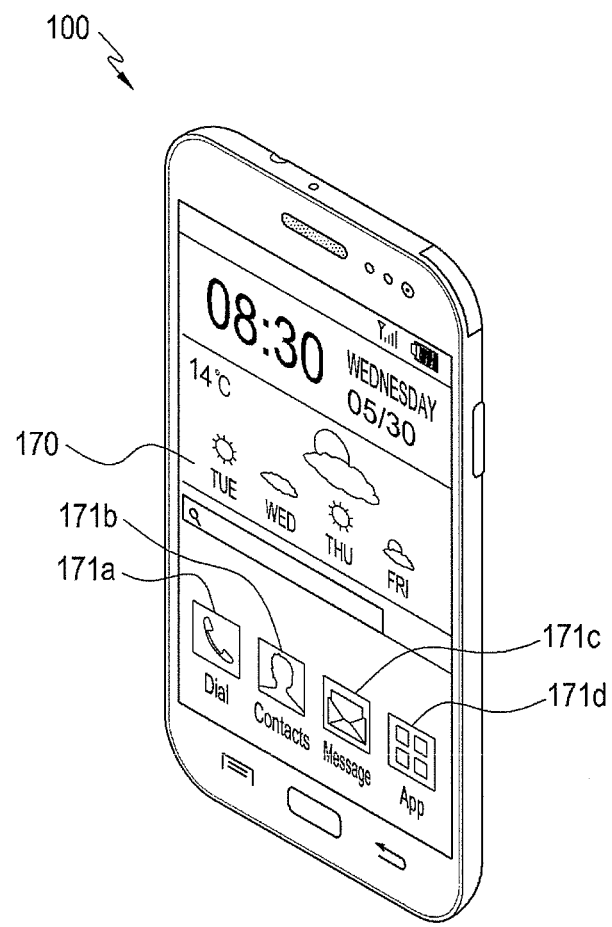
FIG. 5 is a perspective view showing an example of a multimedia device according to an exemplary embodiment of the present invention.

FIG. 5 is a front perspective view showing a multimedia device according to an embodiment of the present invention.

Referring to FIG. 5, a touch screen 171 is disposed on a center of a front surface of a multimedia device 100. The touch screen 171 may be formed large enough to occupy the most of the front surface of the multimedia device 100.

A home screen displayed on the screen of the multimedia device 100 may include different home screens over several pages. Among the home screens over the several pages, the first home screen may be a main home screen as shown in FIG. 5. On the home screen, shortcut icons 171a, 171b, and 171c for executing frequently used applications, a main menu switchover key 171d, time, weather, and so forth may be displayed. The main menu switchover key 171d displays a menu screen on the touch screen 171. A status bar indicating a status of the multimedia device 100, such as a battery charge state, a strength of a received signal, current time, or a volume operation mode, may be formed in an upper end portion of the touch screen 171.

The method according to the embodiments of the present invention may be implemented in the form of a program instruction that may be executed by various computer means, and may be recorded on a computer-readable medium. The computer-readable medium may include a program instruction, a data file, or a data structure alone or in combination. The program instruction recorded in the medium has been specially designed and configured, but may also be well known to and be used by those of ordinary skill in the field of computer software.

The method according to the embodiments of the present invention may be implemented and stored in the form of a program instruction in the storing unit 150 of the multimedia device 100, and the program instruction may be temporarily stored in the RAM 113 included in the controller 110 to execute the method according to the embodiments of the present invention. Thus, the controller 110 controls hardware components included in the multimedia device 100 in response to the program instruction based on the method according to the embodiments of the present invention, and temporarily or continuously stores data generated during execution of the method according to the embodiments of the present invention in the storing unit 150. The controller 110 may also provide a User Interface (UI) necessary for execution of the method according to the embodiments of the present invention to the touch screen controller 172.

As is apparent from the foregoing description, according to an embodiment of the present invention, information recognized from an image captured by a first multimedia device is transmitted to a second multimedia device or an information search server, thereby effectively providing detailed information associated with the captured image.

Moreover, according to an embodiment of the present invention, a finger image is detected in predetermined at least a partial region of an image captured by the first electronic device, thus improving the efficiency of a recognition process, and due to processing reduction, power consumption and processing time may be reduced.

Furthermore, according to an embodiment of the present invention, text scanning with one hand may be possible through a wearable device and in device control using an image, a convenient input means may be provided.

The other effects may be explicitly or implicitly disclosed in the description of the present invention.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method of processing multimedia content on a graphic cloud, the method comprising:
   identifying a multimedia instance received from one of a plurality of multimedia devices, the multimedia instance initiated by a user of the one of the plurality of multimedia devices for receiving a multimedia stream;
   determining a load balance associated with the multimedia instance;
   selecting a graphic card from a plurality of graphic cards for processing the multimedia instance based on a profile including information associated with a processing power and a memory required for processing the multimedia instance;
   activating a plurality of ports associated with the selected graphic card for rendering the multimedia stream associated with the multimedia instance to the one of the plurality of multimedia devices;
   storing the multimedia stream in one of a non-paged memory or a virtual memory, wherein the storing is performed based on a processing speed associated with the multimedia stream; and
   transmitting the multimedia stream to the one of the plurality of multimedia devices.

2. The method of claim 1, wherein the graphic card comprises at least one of plurality of graphic cards stored on the graphic cloud.

3. The method of claim 1, further comprising:
   storing the profile associated with a plurality of multimedia instances for the selection of the graphic card from the plurality of graphic cards for processing the multimedia instance.

4. The method of claim 1, wherein activating comprises:
activating one or more parameters used to define display settings associated with the multimedia stream.

5. The method of claim 1, further comprising:
compressing the multimedia stream prior to transmitting the multimedia stream to the one of the plurality of multimedia devices.

6. An apparatus for processing multimedia content on a graphic cloud, the apparatus comprising:
a communication interface configured to establish communication;
a memory configured to store instructions; and
a processor configured, responsive to the instructions, to:
identify a multimedia instance received from one of a plurality of multimedia devices, the multimedia instance initiated by a user of the one of the plurality of multimedia devices for receiving a multimedia stream;
determine a load balance associated with the multimedia instance;
select a graphic card from a plurality of graphic cards for processing the multimedia instance based on a profile including information associated with a processing power and a memory required for processing the multimedia instance;
activate a plurality of ports associated with the selected graphic card for rendering the multimedia stream associated with the multimedia instance to one of the plurality of multimedia devices;
store the multimedia stream in one of a non-paged memory or a virtual memory, storage being performed based on a processing speed associated with the multimedia stream; and
transmit the multimedia stream to the one of the plurality of multimedia devices.

7. The apparatus of claim 6, wherein the graphic card comprises at least one of a plurality of graphic cards stored on the graphic cloud.

8. The apparatus of claim 6, wherein the processor is configured to:
store the profile associated with a plurality of multimedia instances for the selection of the graphic card from the plurality of graphic cards for processing the multimedia instance.

9. The apparatus of claim 6, wherein the processor is configured to:
activate one or more parameters used to define display settings associated with the multimedia stream.

10. The apparatus of claim 6, wherein the processor is configured to:
compress the multimedia stream prior to transmitting the multimedia stream to the one of the plurality of multimedia devices.

* * * * *